US012619502B2

(12) United States Patent
Borate et al.

(10) Patent No.: US 12,619,502 B2
(45) Date of Patent: May 5, 2026

(54) DATA BACKUP SYSTEM AND METHOD FOR POINT IN TIME RECOVERY

(71) Applicant: Druva Inc., Santa Clara, CA (US)

(72) Inventors: Milind Vithal Borate, Pune (IN); Yogendra Acharya, Pune (IN); Hrishikesh Pallod, Pune (IN); Aayush Gupta, Pune (IN)

( * ) Notice: Subject to any disclaimer, the term of this patent is extended or adjusted under 35 U.S.C. 154(b) by 71 days.

(21) Appl. No.: 18/736,067

(22) Filed: Jun. 6, 2024

(65) Prior Publication Data

US 2025/0265157 A1 Aug. 21, 2025

(30) Foreign Application Priority Data

Feb. 21, 2024 (IN) .............................. 202441012336

(51) Int. Cl.
| | |
|---|---|
| *G06F 12/00* | (2006.01) |
| *G06F 11/1446* | (2026.01) |
| *G06F 11/1471* | (2026.01) |

(52) U.S. Cl.
CPC ...... *G06F 11/1458* (2013.01); *G06F 11/1471* (2013.01); *G06F 2201/84* (2013.01)

(58) Field of Classification Search
CPC ............. G06F 11/1458; G06F 11/1471; G06F 11/1446; G06F 2201/84; G06F 3/065; G06F 11/1451; G06F 11/1469
See application file for complete search history.

(56) References Cited

U.S. PATENT DOCUMENTS

2015/0378830 A1* 12/2015 Hoobler, III ........ G06F 11/1458
707/648

* cited by examiner

*Primary Examiner* — Shawn X Gu
(74) *Attorney, Agent, or Firm* — Vorys, Sater, Seymour and Pease, LLP

(57) ABSTRACT

A data backup system configured to enable point in time recovery is presented. The data backup system is configured to enable point in time recovery using a full backup storage space and a unique log backup storage space thereby enabling parallel full backups and archive log backups. A related method is also presented.

17 Claims, 5 Drawing Sheets

DATA BACKUP SYSTEM AND METHOD FOR POINT IN TIME RECOVERY

PRIORITY STATEMENT

The present application claims priority under 35 U.S.C. § 119 to Indian patent application number 202441012336 filed 21 Feb. 2024 the entire contents of which are hereby incorporated herein by reference.

BACKGROUND

Embodiments of the present invention generally relate to data backup systems and methods, and more particularly to data backup systems and methods that enable point in time recovery by performing a full backup and one or more archive log backups parallelly.

Enterprises these days seek reliable, cost-effective ways to protect the data stored on their computer networks while minimizing the impact on productivity. An enterprise might backup critical computing systems such as databases, file servers, web servers, virtual machines, and as part of a daily, weekly, or monthly maintenance schedule. The backup may be performed by storing a plurality of snapshots at pre-defined intervals. In the event of data loss or data corruption because of malware/ransomware, the backed-up data may be restored to the primary data source or another restore destination. The back up may include one or more full backups, incremental backups, and archive log backups. However, currently, database backups have gaps in point in time recovery range for durations of full backups, which could span days. This reduces the restore point optimization for the customer. In addition to this, there is cross dependency between full and log recovery points resulting in complications in recovery point expiry and restores.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a data backup system configured to enable point in time recovery is presented. The data backup system includes a storage initialization module configured to send a request to a data backup server to initialize a full backup storage space and a unique log backup storage space when a full backup is initiated. The data backup system further includes a log backup module configured to perform backup of one or more scheduled archive logs on the unique log backup storage space. The data backup system furthermore includes a full backup module configured to perform backup of one or more data files on the full backup storage space, and further configured to send one or more commands to the log backup module to initiate and terminate the backup of one or more archive logs on the unique log backup space such that the backup of one or more data files and the one or more archive logs is performed parallelly during the full backup.

According to another example embodiment, a data backup system configured to enable point in time recovery is presented. The data backup system includes a memory storing one or more processor-executable routines and a processor communicatively coupled to the memory. The processor is configured to execute the one or more proces-sor-executable routines to send a request to a data backup server to initialize a full backup storage space and a unique log backup storage space when a full backup is initiated; perform backup of one or more data files on the full backup storage space; and send one or more commands to initiate and terminate backup of one or more archive logs on the unique log backup space such that the backup of one or more data files and the one or more archive logs is performed parallelly during the full backup.

According to another example embodiment, a method for data backup that enables point in time recovery is presented. The method includes sending a request to a data backup server to initialize a full backup storage space and a unique log backup storage space when a full backup is initiated; performing backup of one or more data files on the full backup storage space; and performing backup of one or more archive logs on the unique log backup space such that the backup of one or more data files and the one or more archive logs is performed parallelly during the full backup.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
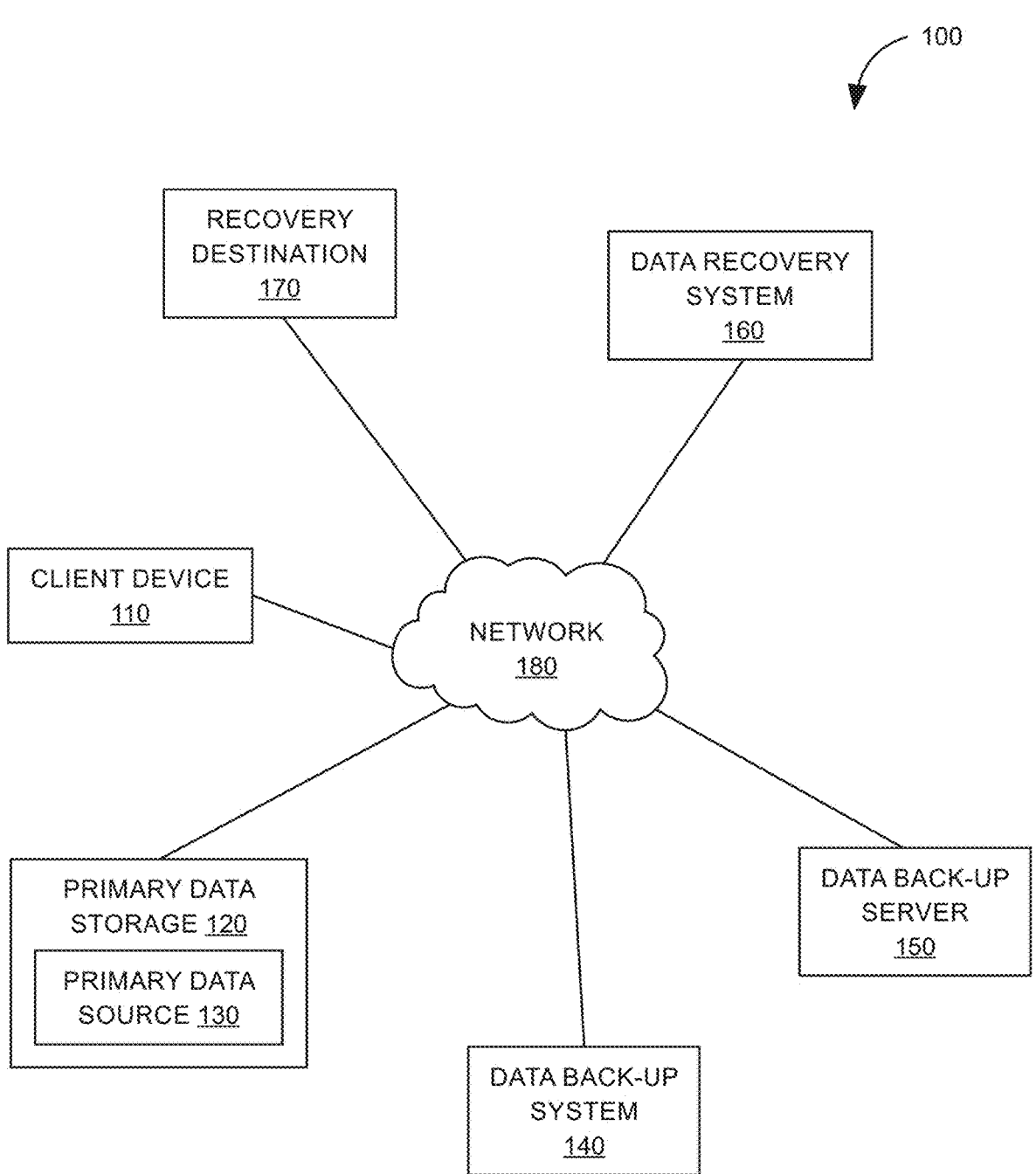
FIG. 1 is a block diagram illustrating an example data backup and recovery system environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide data backup systems and methods. Some embodiments of the present description provide data backup systems and methods that enable point in time recovery by performing a full backup and one or more archive log backups parallelly.

FIG. 1 illustrates an example data backup and restore system environment 100, in accordance with some embodiments of the present description. The system environment 100 includes a client device 110, a primary data storage 120, a primary data source 130, a data backup system 140, a data backup server 150, a data recovery system 160, and a recovery destination 170.

The system environment 100 may be configured to store backup data from the primary data source 130 in the data backup server 150 using the data backup system 140. Further, the system environment 100 may be configured to restore at least a portion of the backup data to the recovery destination 170 using the data recovery system 160. The primary data source 130 stores data generated by the client device 110, and although the primary data source 130 and the client device 110 are represented as two different blocks, the primary data source 130 may be present in the client device 110 itself. Similarly, although the recovery destination 170 and the client device 110 are represented as two different blocks, in some embodiments, the recovery destination 170 may be present in the client device 110 itself. Further, in some embodiments, a location of the recovery destination 170 may be the same as a location of the primary data source 130.

The client device 110 may be any computing device that has data that may need backup. Examples of such client devices 110 include without limitation, workstations, personal computers, desktop computers, or other types of generally fixed computing systems such as mainframe computers, servers, and minicomputers. Other examples of such client devices 110 include mobile or portable computing devices, such as one or more laptops, tablet computers, personal data assistants, mobile phones (such as smartphones), IoT devices, wearable electronic devices such as smartwatches, and other mobile or portable computing devices such as embedded computers, set-top boxes, vehicle-mounted devices, wearable computers, etc. Servers can include mail servers, file servers, database servers, virtual machine servers, and web servers.

Further, it should be noted that although FIG. 1 only illustrates a single client device, the data backup and restore system environment 100 may also include a plurality of client devices. In some such embodiments, the clients may be heterogeneous. For example, the clients may be of different types, such as individual end-users, organizations, businesses, webpage providers, servers, and the like. Although clients may be heterogeneous, from the point of view of the backup system 140 and the recovery system 160, the plurality of client devices 110 that may need data backup and recovery services may be treated in the same or a similar manner. In some other embodiments, the clients and/or client devices 110 may be of the same type.

The system environment 100 further includes a primary data source 130. In some embodiments, the primary data source 130 is located in a primary data storage 120 configured for mass storage of data. The primary data storage 120 may be packaged/configured with the client device 110 (e.g., an internal hard disk) and/or may be external and accessible by the client device 110 (e.g., network-attached storage, a storage array, etc.). Non-limiting examples of primary data storage 120 include, without limitation, disk drives, storage arrays (e.g., storage-area network (SAN) and/or network-attached storage (NAS) technology), semiconductor memory (e.g., solid-state storage devices), network attached storage (NAS) devices, tape libraries, or other magnetic, non-tape storage devices, optical media storage devices, or combinations thereof. In some embodiments, the primary data storage 120 may be part of a distributed file system. In some embodiments, the primary data storage 120 is provided in a cloud storage environment (e.g., a private cloud or one operated by a third-party vendor).

The primary data storage 120 may be dedicated or shared. In some embodiments, each primary data storage 120 is dedicated to an associated client 110, e.g., a local disk drive. In other embodiments, one or more primary data storage 120 can be shared by multiple client devices 110, e.g., via a local network, in a cloud storage implementation, etc.

According to some embodiments, the client device 110 can access data stored in the primary data source 130 by making conventional file system calls via the operating system. Each client device 110 is generally associated with and/or in communication with one or more primary data sources 130 storing data. A client device 110 is said to be associated with or in communication with a particular primary data source 130 if it is capable of one or more of: routing and/or storing data to the primary data source 130, coordinating the routing and/or storing of data to the primary data source 130, retrieving data from the primary data source 130, coordinating the retrieval of data from the primary data source 130, and modifying and/or deleting data in the primary data source 130.

The data present in the primary data source 130 is generally data generated by the operating system and/or applications executing on the client device 110. In general, the data present in the primary data source 130 may include files, directories, file system volumes, data blocks, extents, virtual disks, or any other hierarchies or organizations of data objects. As used herein, the term "data object" refers to (i) any file that is currently addressable by a file system or that was previously addressable by the file system (e.g., an archive file), and/or (ii) a subset of such a file (e.g., a data block, an extent, etc.). The data present in the primary data source 130 may further include structured data (e.g., database files), unstructured data (e.g., documents), and/or semi-structured data. In some embodiment, the data backup system and environment in accordance with embodiments of the present description is configured to backup databases, The primary data source 130 also includes metadata associated with the data present in the primary data source 130. Metadata generally includes information about data objects and/or characteristics associated with the data objects. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications and/or other components of the client device 110 maintain indices of metadata for data objects, e.g., metadata associated with individual email messages.

The data backup system 140 may be a software or a hardware component that enables the client device 110 to store and backup data and search and access the backup data. The data backup system 140 may further provide a graphical user interface (not shown) for individual clients to access data backup server 150 for data management. For example, a graphical user interface may be a front-end storage interface. Additionally, or alternatively, the data backup system 140 may provide APIs for the access and management of files from the client device 110.

The data backup system 140 may be configured to perform backup by storing a plurality of snapshots corresponding to the data backup schedule in the data backup server 150. The backup schedule for the client device 110 may be installed with a client utility application or configured within the host operating system (OS), using the data backup system 140. At the scheduled time, the client device 110 may connect with the data backup server 150 via the data backup system 140 to initiate the data backup process. (either full or incremental). For example, the first instance of data backup may involve a full backup of the data from the primary data source 130 to the data backup server 150, followed by incremental backups depending on the backup schedule.

The data backup server 150 may combine hardware and software technologies that provide backup storage and retrieval services to the client device 110 via the data backup system 140. In some embodiments, the data backup server 150 is a cloud-based storage. The backup data from the primary data source 130 may be stored and backed up in an object-based storage, a file-based storage, or a block-based storage. In some embodiments, the backup data is stored in a block-based storage. Non-limiting examples of suitable data backup server 150 include AWS Elastic Block storage, GOOGLE CLOUD Persistent Disks, RACKSPACE Cloud Block Storage, and the like.

The data recovery system 160, is configured to recover data from the data backup server 150. In some embodiments, the data recovery system 160, is configured to recover data from the data backup server 150. The data backup and recovery system environment 100 further includes a recovery destination 170. The recovery destination 170 may be located at the same location as the primary data source 130, in some embodiments. In such instances, for example, the data recovery system 160 may be configured to overwrite the data on the primary data source 130 to restore the data to a particular point. In such instances, although the data recovery destination 170 and the primary data source 130 and/or primary data storage 120 are shown as different blocks, the block representing the data restore destination 170 may be the same as the block representing the primary data source 130. Further, in embodiments where the primary data storage 120 is a storage system internal to the client device 110, the blocks representing the primary data source 130, the primary data storage 120, and the destination location 170 may be present in the client device 110 itself.

The various components in the system environment 100 may communicate through the network 180 and/or locally. For example, in some embodiments, one of the system components may communicate locally with the data backup system 140, while other components communicate with the data backup system 140 through the networks. In other embodiments, every component in the system environment 100 is online and communicates with each other through the network 180. In one embodiment, the network 180 uses standard communications technologies and/or protocols. Thus, the network 180 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 180 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the components of the system environment 100 are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
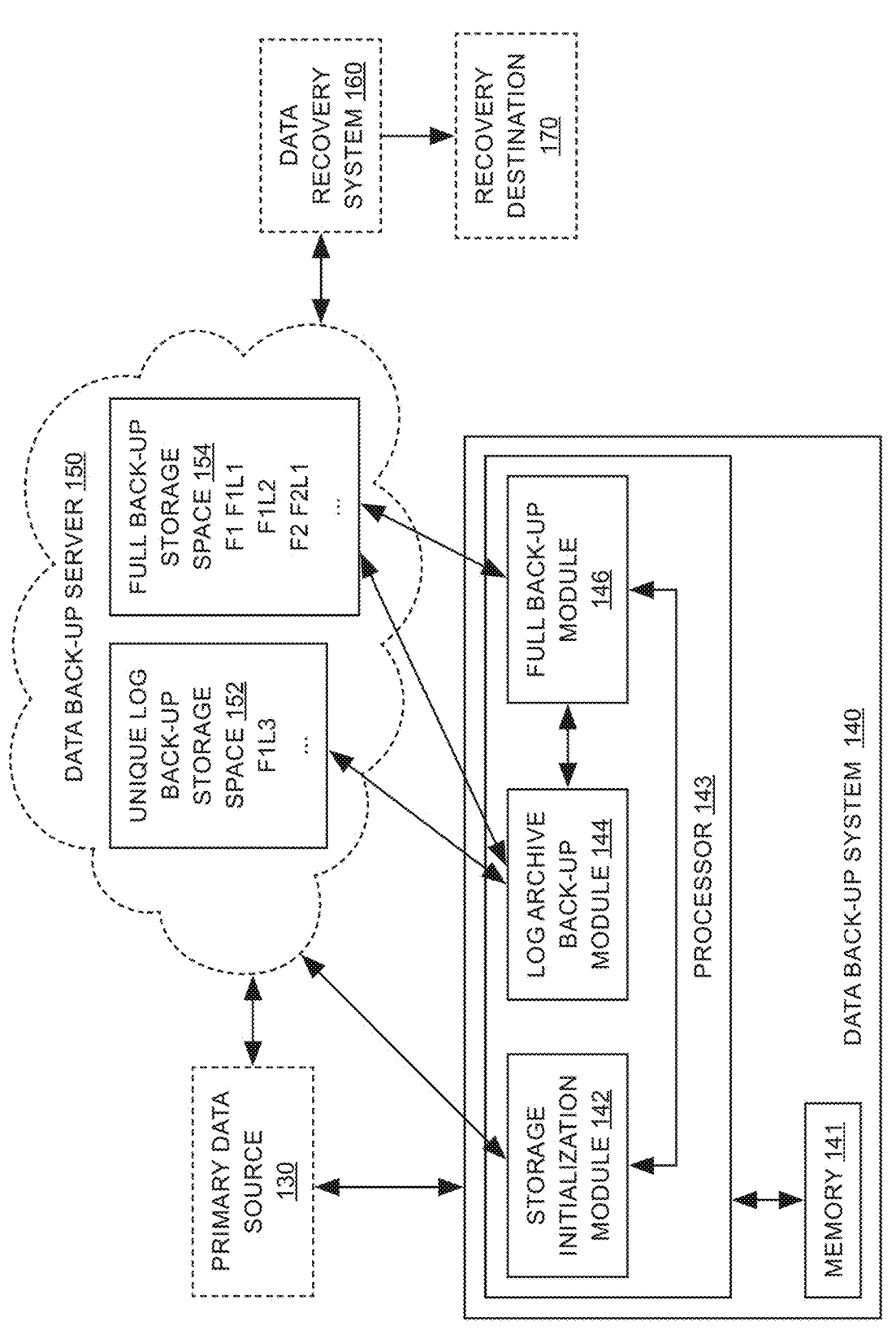
FIG. 2 is a block diagram illustrating an example data backup system, according to some aspects of the present description.

FIG. 2 is a block diagram of a data backup system 140 in accordance with embodiments of the present description. The data backup system 140 in accordance with embodiments of the present description is configured to enable point in time recovery by performing a full backup and one or more archive log backups parallelly. The data backup system includes a storage initialization module 142, a log backup module 144, and a full backup module 146. Each of these components will be described in detail below with reference to FIG. 2.

The storage initialization module 142 is configured to send a request to the data backup server 150 to initialize a unique log backup storage space 152 and a full backup storage space 154 when a full backup is initiated. In accordance with embodiments of the present description, the unique log backup storage space 152 is initialized at logical time t–1 and the full backup storage space 154 is initialized at logical time t. As described in detail later, embodiments of the present invention enable consistent parallel backups through the unique log backup storage space 152 created just before starting the full backup, wherein the full backup job writes data files to its own space 154, and the scheduled log backup jobs writes to the unique log backup space 152.

The data backup system 140 further includes a log backup module as shown in FIG. 2. The log backup module 144 is configured to perform backup of one or more scheduled archive logs on the unique log backup storage space 152 when a full backup is initiated. As described in detail later, the log backup module is further configured to perform backup of one or more scheduled archive logs in the same space as the full backup storage space 154 in between two full backup jobs. The full backup module 146 is configured to perform backup of one or more data files on the full backup storage space 154, e.g., based on a predefined backup schedule. As noted earlier, the full backup schedule and the archive log backup schedule may be determined by the end user depending on their preference.

In accordance with embodiments of the present description, the log backup module is further configured to perform backup of one or more archive logs in the unique log backup storage space 152 when a full backup is initiated, thus enabling parallel full and archive log backups. In accordance with embodiments of the present description, the log backup module 144 is further configured to commit a single log recovery point corresponding to the one or more archive logs backed up in the unique log backup storage space 152.

Referring again to FIG. 2, the full backup module 146 is further configured to send one or more commands to the log backup module 144 to initiate and terminate the backup of one or more archive logs on the unique log backup space 152 such that the backup of one or more data files and the one or more archive logs is performed parallelly during the full backup.

In accordance with embodiments of the present description, once backup of one or more data files is initiated, the full backup module 146 is configured to send a command to the log backup module 144 to perform a log backup of the one or more scheduled archive logs on the unique log backup storage space 152 during the full backup. Further, once backup of one or more data files is completed, the full backup module 146 is further configured to send a command to the log backup module 144 to complete any ongoing log backup or perform a last log backup on the unique log backup space 152, and close the unique log backup space 152.

As noted earlier, the log backup module 144 is configured to commit a single log recovery point corresponding to the one or more archive logs backed up in the unique log backup storage space 152. The single log recovery point has a point in time end time just before the completion of the data file backup by the full backup module 146. The full backup module 146 is further configured to commit a full backup recovery point having a point in time end time based on the point in time supported by one or more archive logs backed up as part of a last log backup performed as part of the current full backup. Thus, enabling a full point in time recovery window during the full backup.

In accordance with embodiments of the present description, the log backup module 144 is configured to assign a single version number to the single log recovery point that is lower than a version number assigned to the full backup recovery point corresponding to the current full backup. Thus, the single log recovery point is available for recovery to a previous full backup recovery point created before the current full backup was initiated and the full backup recovery point created during the current full backup.

Referring again to FIG. 2, in some embodiments, the data backup system includes a memory 141 storing one or more processor-executable routines, and a processor 143 communicatively coupled to the memory 141. The processor 143 includes a storage initialization module 142, a log backup module 144, and a full backup module 146. Each of these components is described in detail earlier. The processor 143 is configured to execute the one or more processor-executable routines to perform the steps illustrated in the flowchart of FIG. 3. It should be noted that the present description encompasses embodiments including a single processor as well as multiple processors.

Figure 3:
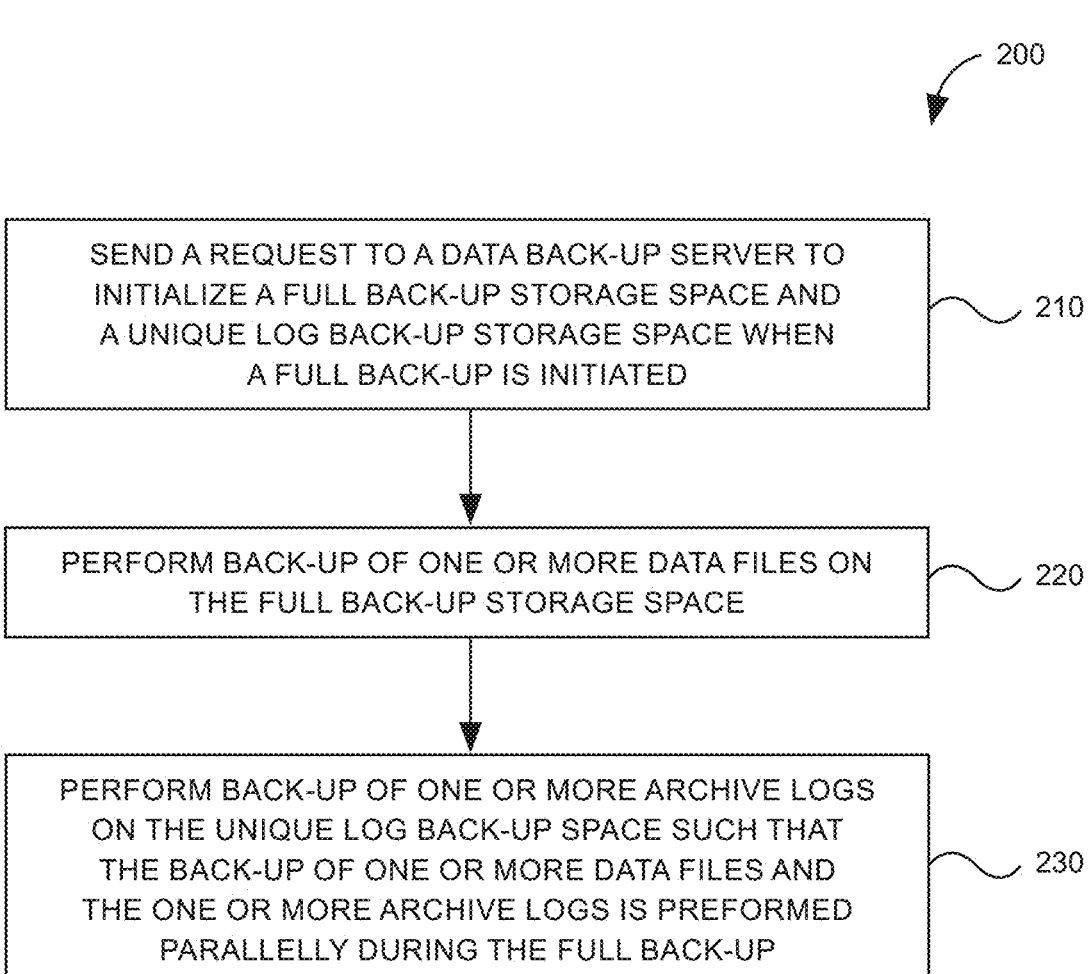
FIG. 3 is an illustration of point in time recovery timeline, according to some aspects of the present description.

Referring now to FIG. 3, a method 200 for data backup that enables point in time recovery is presented. In accordance with embodiments of the present invention, the method 200 enables point in time recovery by performing a full backup and one or more archive log backups parallelly.

The method 200 includes, at block 210 sending a request to a data backup server to initialize a full backup storage space and a unique log backup storage space when a full backup is initiated. The unique log backup storage space is initialized at logical time t−1 and the full backup storage space is initialized at logical time t.

The method 200 further includes, at block 212, performing backup of one or more data files on the full backup storage space. The method 200 further includes, at block 214, performing backup of one or more archive logs on the unique log backup space such that the backup of one or more data files and the one or more archive logs is performed parallelly during the full backup.

In accordance with embodiments of the present description, the method 200 further includes, at block 214, performing a log backup of the one or more scheduled archive logs on the unique log backup storage space during the full backup once backup of one or more data files is initiated. The method 200 further includes, at block 214, completing any ongoing log backup or performing a last log backup on the unique log backup space once backup of one or more data files is completed, and closing the unique log backup space.

The method 200, further includes, at block 214, committing a single log recovery point corresponding to the one or more archive logs backed up in the unique log backup storage space, wherein the single log recovery point has a point in time end time just before the completion of the data file backup by the full backup module.

The method 200, further includes, at block 212, committing a full backup recovery point having a point in time end time based on the point in time supported by one or more archive logs backed up as part of a last log backup performed as part of the current full backup.

In accordance with embodiments of the present description, the method 200 further includes assigning a single version number to the single log recovery point that is lower than a version number assigned to the full backup recovery point corresponding to the current full backup. Thus, the single log recovery point is available for recovery to a previous full backup recovery point created before the current full backup was initiated and the full backup recovery point created during the current full backup.

Figure 4:
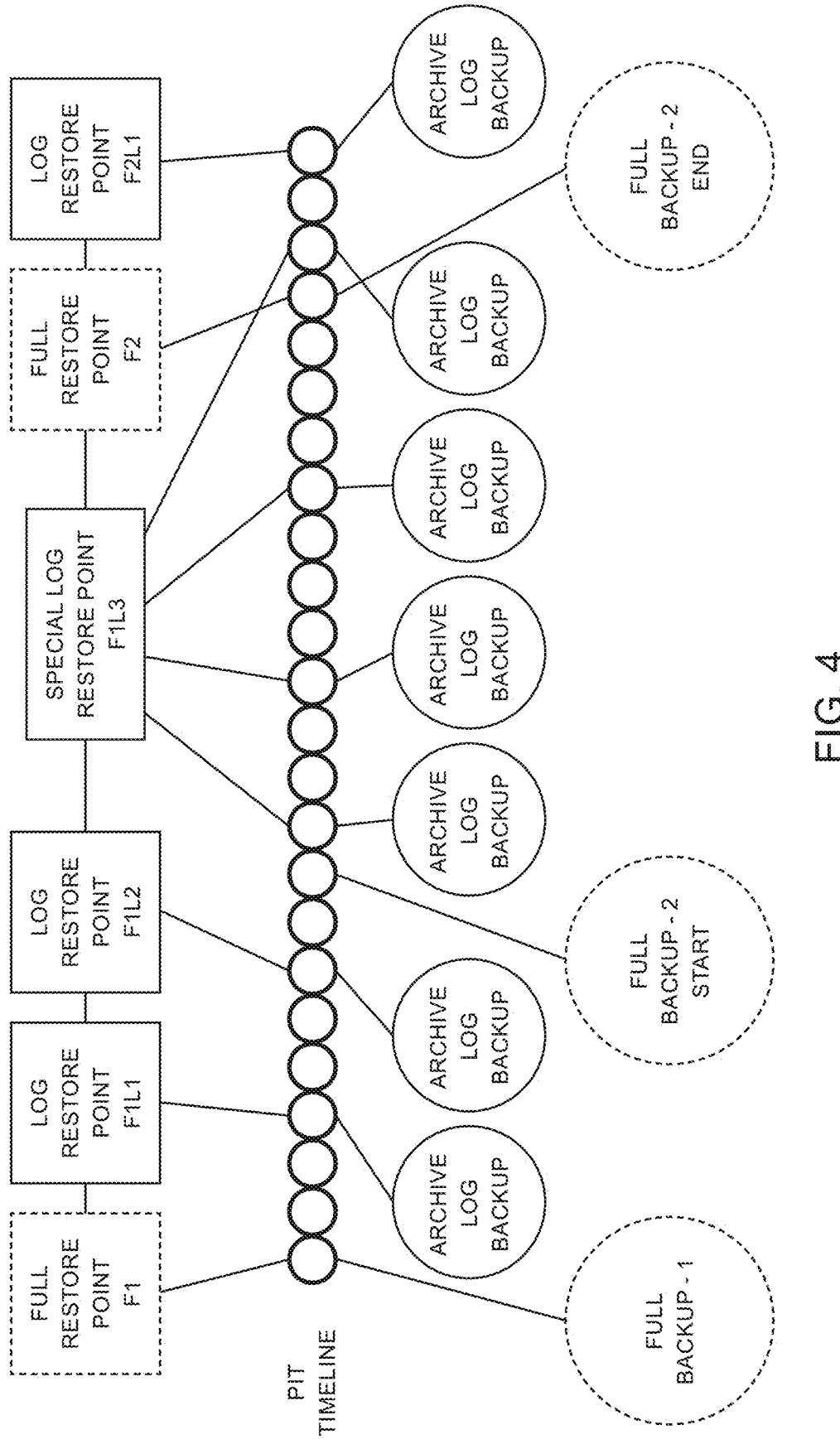
FIG. 4 is a flow chart illustrating a method for data backup, according to some aspects of the present description.

The systems and methods as described herein are further exemplified using an example timeline of full backups and archive log backups as shown in FIG. 4 with reference to the data backup system of FIG. 2. FIG. 4 shows a point in time (PIT) recovery timeline for two full backups: full backup-1 and full backup 2.

As shown in FIGS. 2 and 4, the first full backup-1 is committed to the full backup storage space 154 by the full backup module 146 in the backup server 150 as restore point F1. Further, the log archive backup module 144 is configured to perform backup of the scheduled archive logs: archive log 1 and archive logs 2 and commit corresponding log restore points F1L1 and F1L2 in the full backup storage space 154.

At the start of the next full backup-2, the full backup module 146 is configured to send a command to the log archive backup module 144 to initiate backup of one or more archive logs in the unique log backup storage space 152 and commit a single restore point F1L3 corresponding to the one or more archive logs backed up in the unique log backup storage space 152. As shown in FIG. 4, the single log recovery point F1L3 has a point in time end time just before the completion of the data file backup by the full backup module 146. Further, the full backup module 146 is configured to commit a full backup recovery point F2 having a point in time end time based on the point in time supported by one or more archive logs F1L3 backed up as part of a last log backup performed as part of the current full backup. As noted earlier, the single log recovery point F1L3 is available for recovery to a previous full backup recovery point F1 created before the current full backup was initiated and the full backup recovery point F2 created during the current full backup. Referring again to FIG. 4, after the second full back up is complete, the log backup module 144 is further configured to backup one or more archive logs as per the archive log backup schedule and commit a corresponding recovery point (e.g., F2L1) in the full backup storage space.

In some embodiments, the example illustrated in FIG. 4 is further described with respect to a versioning system as given below in Table 1. As shown in Table 1, when full backup and log backups are done exclusively, each restore point created has its own unique version. For example, restore point F1 has version 16, restore point F1L1 has version 17 and restore point F1L2 has version 18. However, in accordance with embodiments of the present invention, during parallel log backups corresponding to a single restore point F1L3 a single version is assigned, i.e., version 19. In such an instance all the parallel log backups along with the last full backup will backup with that version (as shown in FIG. 4. Since files created during parallel log backups have version lesser than full backup (F2 has version 20) all the files present in F1L3 will be available with F2 as well for recovery. As mentioned earlier, this special handling of version is executed only for parallel backups and as soon as the parallel backup is completed, each restore point is assigned its own version again.

TABLE 1

| Recovery point and corresponding version numbers | |
| --- | --- |
| Recovery Point | Version Number |
| F1 | 16 |
| F1L1 | 17 |
| F1L2 | 18 |
| F1L3 | 19 |
| F2 | 20 |
| F2L1 | 21 |

As noted earlier, currently, database backups have gaps in point in time recovery range for durations of full backups, which could span days. This reduces the recovery point optimization or the customer. In addition to this, there is cross dependency between full and log recovery points resulting in complications in recovery points expiry and restores. Embodiments of the present invention enable improvement in recovery point optimization through parallel log and full backups. Further, embodiments of the present invention also reduce cross dependency between full and log recovery points thereby reducing the complexity of restores and recovery point expiry. Moreover, embodiments of the present invention enable consistent parallel backups through a unique log backup space created just before starting the full backup such that the full backup job writes data files to its own space, and the scheduled log backup jobs writes to the unique log backup space.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process, and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special-purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv)

source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 5:
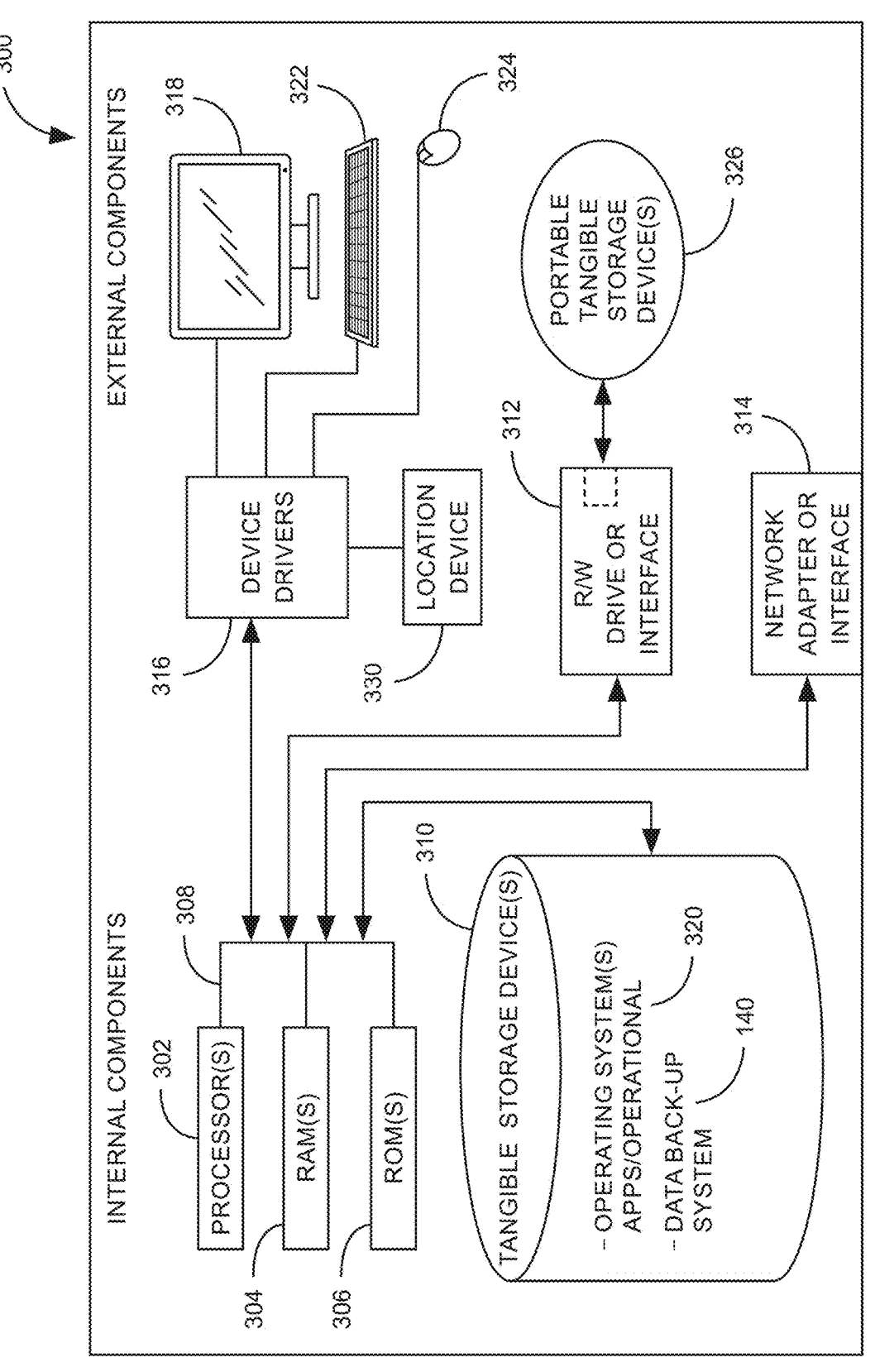
FIG. 5 is a block diagram illustrating an example computer system, according to some aspects of the present description.

One example of a computing system 300 is described below in FIG. 5. The computing system 300 includes one or more processor 302, one or more computer-readable RAMs 303 and one or more computer-readable ROMs 306 on one or more buses 308. Further, the computer system 308 includes a tangible storage device 310 that may be used to execute operating systems 320 and the data backup system 140. Both, the operating system 320 and the data backup system 140 are executed by processor 302 via one or more respective RAMs 303 (which typically includes cache memory). The execution of the operating system 320 and/or the data backup system 140 by the processor 302, configures the processor 302 as a special-purpose processor configured to carry out the functionalities of the operating system 320 and/or the ransomware scan system, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 3G wireless interface cards or other wired or wireless communication links are also included in the computer system 300.

In one example embodiment, the data backup system 140 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

What is claimed is:

1. A data backup system configured to enable point in time recovery, the data backup system comprising:
  a storage initialization module configured to send a request to a data backup server to initialize a full backup storage space and a unique log backup storage space when a full backup is initiated;
  a log backup module configured to perform backup of one or more scheduled archive logs on the unique log backup storage space; and
  a full backup module configured to perform backup of one or more data files on the full backup storage space, and further configured to send one or more commands to the log backup module to initiate and terminate the backup of one or more archive logs on the unique log backup storage space such that the backup of one or more data files and the one or more archive logs is performed parallelly during the full backup,
  wherein:
  once the backup of one or more data files is initiated, the full backup module is configured to send a command to the log backup module to perform a log backup of the one or more scheduled archive logs on the unique log backup storage space during the full backup; and
  once the backup of one or more data files is completed, the full backup module is further configured to send a command to the log backup module to complete any ongoing log backup or perform a last log backup on the unique log backup storage space, and close the unique log backup storage space.

2. The data backup system of claim 1, wherein the unique log backup storage space is initialized at a first time and the full backup storage space is initialized at a second logical time that is later than the first time.

3. The data backup system of claim 2, wherein the log backup module is further configured to commit a single log recovery point corresponding to the one or more archive logs backed up in the unique log backup storage space, wherein the single log recovery point has a point in time end time just before completion of the backup of one or more data files by the full backup module.

4. The data backup system of claim 3, wherein the full backup module is further configured to commit a full backup recovery point having a point in time end time based on a point in time supported by one or more archive logs backed up as part of a last log backup performed as part of a current full backup.

5. The data backup system of claim 4, wherein the single log recovery point corresponding to the one or more archive logs is assigned a single version number that is lower than a version number assigned to the full backup recovery point corresponding to the current full backup.

6. The data backup system of claim 5, wherein the single log recovery point is available for recovery to a previous full backup recovery point created before the current full backup was initiated and the full backup recovery point created during the current full backup.

7. A data backup system configured to enable point in time recovery, the data backup system comprising:
  a memory storing one or more processor-executable routines; and
  a processor communicatively coupled to the memory, the processor configured to execute the one or more processor-executable routines to:
  send a request to a data backup server to initialize a full backup storage space and a unique log backup storage space when a full backup is initiated;
  perform backup of one or more scheduled archive logs on the unique log backup storage space;
  perform backup of one or more data files on the full backup storage space; and
  send one or more commands to initiate and terminate the backup of one or more archive logs on the unique log backup storage space such that the backup of one or more data files and the one or more archive logs is performed parallelly during the full backup,
  wherein:
  once the backup of one or more data files is initiated, the processor is further configured to execute the one or more processor-executable routines to send a command to perform a log backup of the one or more scheduled archive logs on the unique log backup storage space during the full backup; and
  once the backup of one or more data files is completed, the processor is further configured to execute the one or more processor-executable routines to send a command to complete any ongoing log backup or perform a last log backup on the unique log backup storage space, and close the unique log backup storage space.

8. The data backup system of claim 7, wherein the unique log backup storage space is initialized at a first time and the full backup storage space is initialized at a second time that is later than the first time.

9. The data backup system of claim 8, wherein the processor is further configured to execute the one or more processor-executable routines to commit a single log recovery point corresponding to the one or more archive logs backed up in the unique log backup storage space, wherein the single log recovery point has a point in time end time just before completion of the backup of one or more data files.

10. The data backup system of claim 9, wherein the processor is further configured to execute the one or more processor-executable routines to commit a full backup recovery point having a point in time end time based on a point in time supported by one or more archive logs backed up as part of a last log backup performed as part of a current full backup.

11. The data backup system of claim 10, wherein the processor is further configured to execute the one or more processor-executable routines to assign a single version number to the single log recovery point that is lower than a version number assigned to the full backup recovery point corresponding to the current full backup, and wherein the single log recovery point is available for recovery to a previous full backup recovery point created before the current full backup was initiated and the full backup recovery point created during the current full backup.

12. A method for data backup that enables point in time recovery, comprising:

sending a request to a data backup server to initialize a full backup storage space and a unique log backup storage space when a full backup is initiated;

performing backup of one or more data files on the full backup storage space;

performing backup of one or more archive logs on the unique log backup storage space such that the backup of one or more data files and the one or more archive logs is performed parallelly during the full backup;

performing a log backup of one or more scheduled archive logs on the unique log backup storage space during the full backup once the backup of one or more data files is initiated; and completing any ongoing log backup or performing a last log backup on the unique log backup storage space once the backup of one or more data files is completed, and closing the unique log backup storage space.

13. The method of claim 12, wherein the unique log backup storage space is initialized at a first time and the full backup storage space is initialized at a second time that is later than the first time.

14. The method of claim 13, further comprising committing a single log recovery point corresponding to the one or more archive logs backed up in the unique log backup storage space, wherein the single log recovery point has a point in time end time just before completion of the backup of one or more data files.

15. The method of claim 14, further comprising committing a full backup recovery point having a point in time end time based on a point in time supported by one or more archive logs backed up as part of a last log backup performed as part of a current full backup.

16. The method of claim 15, further comprising assigning a single version number to the single log recovery point that is lower than a version number assigned to the full backup recovery point corresponding to the current full backup.

17. The method of claim 16, wherein the single log recovery point is available for recovery to a previous full backup recovery point created before the current full backup was initiated and the full backup recovery point created during the current full backup.

* * * * *